US005365285A

United States Patent [19]

Kizuya et al.

[11] Patent Number: 5,365,285

[45] Date of Patent: Nov. 15, 1994

[54] CRT DISPLAY DEVICE WITH A GROUNDED RIMBAND SO AS TO SUPPRESS AN ELECTRO-MAGNETIC EMISSION

[75] Inventors: Isao Kizuya, Hitachi; Kenkichi Yamashita, Katsuta; Kunihiko Onuma; Akira Hoshikawa, both of Hitachi, all of Japan

[73] Assignee: Hitachi, Ltd., Tokyo, Japan

[21] Appl. No.: 670,197

[22] Filed: Mar. 15, 1991

[30] Foreign Application Priority Data

Mar. 16, 1990 [JP] Japan .................................. 2-64230

[51] Int. Cl.[5] .............................................. H04N 5/65

[52] U.S. Cl. .................................... 348/818; 348/819

[58] Field of Search ............... 358/254, 245, 247, 255; 313/402, 407, 408, 478, 479; 348/818-820; H04N 5/65

[56] References Cited

U.S. PATENT DOCUMENTS 5,025,490 6/1991 Tamura ................................ 348/819

5,145,434 9/1992 Pauplis et al. ........................ 348/818

*Primary Examiner*—Reinhard J. Eisenzopf
*Assistant Examiner*—Jill Jackson
*Attorney, Agent, or Firm*—Antonelli, Terry, Stout & Kraus

[57] ABSTRACT

A CRT display unit provides for reduced electromagnetic radiation emission by encasing a video amplifier for amplifying image signals sent from a computer and a CRT device for displaying the amplified image signals within a chassis; coating conductive films on the external and internal surfaces of the funnel section of the CRT envelope; covering the circumference of the panel section with a metal rim band; fastening the envelope to the chassis via metal fixtures installed on the rim band; electrically connecting the conductive film coated on the external surface to the rim band by means of a first conductive member; and electrically connecting the space between the rim band on the panel section fastened to the chassis via metal fixtures and the chassis using a second conductive member.

5 Claims, 4 Drawing Sheets

CRT DISPLAY DEVICE WITH A GROUNDED RIMBAND SO AS TO SUPPRESS AN ELECTRO-MAGNETIC EMISSION

BACKGROUND OF THE INVENTION

The present invention relates to CRT display equipment, and in particular to a CRT display unit in which it is possible to significantly reduce electromagnetic radiation leaking from the front panel thereof in a simple and effective way.

In CRT display units, wherein image micro signals having a rectangular waveform and high frequency are received from a computer and are amplified to amplitudes large enough to be able to form an image on the front screen of the units, the input rectangular waveform image signals contain a large amount of harmonic components. Further, the higher the basic clock frequency of image signals becomes or the larger the amplified signal amplitude becomes, the greater the electromagnetic radiation becomes.

This electromagnetic radiation, when it penetrates into electronic devices disposed in the vicinity of the CRT display units, will cause electromagnetic interference and various malfunctions, so that it is necessary to adopt countermeasures to eliminate, as much as possible, any electromagnetic radiation generated in the CRT display units. As an example of such countermeasures, in Japanese Patent Laid-Open No. 58-7751 (1983), there is described an embodiment wherein a conductive film coated on the surface of the funnel portion of the CRT envelope is extended as far as the rim band around the panel section of the envelope to provide grounding. In another example of such countermeasures, as described in Japanese Patent Laid-open No. 62-267790 (1987), grounding is provided at two points, i.e. one point from a conductive film coating and the other point from the rim band, respectively.

As for the electromagnetic radiation leaking from CRT display equipment, various countries have set their own rules and regulations to control this problem. For example, in Japan and the U.S.A., control rules and regulations have been established against such EMI by the voluntary Control Council for Interference by Data Processing Equipment and Electronic Office Machines (VCCI), and the Federal Communications Commission (FCC).

These rules and regulations demand that the magnitude of such EMI radiation, when measured at a given distance from an EMI radiation source, not exceed limiting values set for particular frequency bands, and the standards imposed are stricter with the VCCI regulations than with the FCC regulations. In fact, the apparatus described in the above-mentioned Japanese Patent Laid-open No. 58-7751 (1983) has at least one frequency band where the VCCI rules and regulations cannot be conformed to, and the Japanese Patent Laid-Open No. 62-267790 (1987) narrowly measures up to the rules and regulations required with the smallest margin. Because EMI control is very sensitive and delicate, and even will accompany scattering in measured values for the same countermeasures taken, it is desirable for the regulation values to be cleared with plenty of margin.

SUMMARY OF THE INVENTION

In view of the requirements hereinabove-stated, an object of the present invention is to provide a CRT display unit which is capable of attaining the required values imposed by regulation on such units with respect to EMI.

According to the present invention, such problems as stated above are solved by forming an electromagnetic shield plate with a shadow mask in a CRT envelope, which shield plate is electrically connected to a rim band and is further fastened to the chassis by means of metal fixtures, and by electrically connecting the rim band and the chassis by means of conductive members inserted in the space therebetween.

According to the present invention, because of the electrical connection of conductive members in the space between the rim band and the chassis, electromagnetic radiation leaking from the space is capable of being reduced significantly.

DETAILED DESCRIPTION OF THE PREFERRED EMBODIMENT

Figure 1:
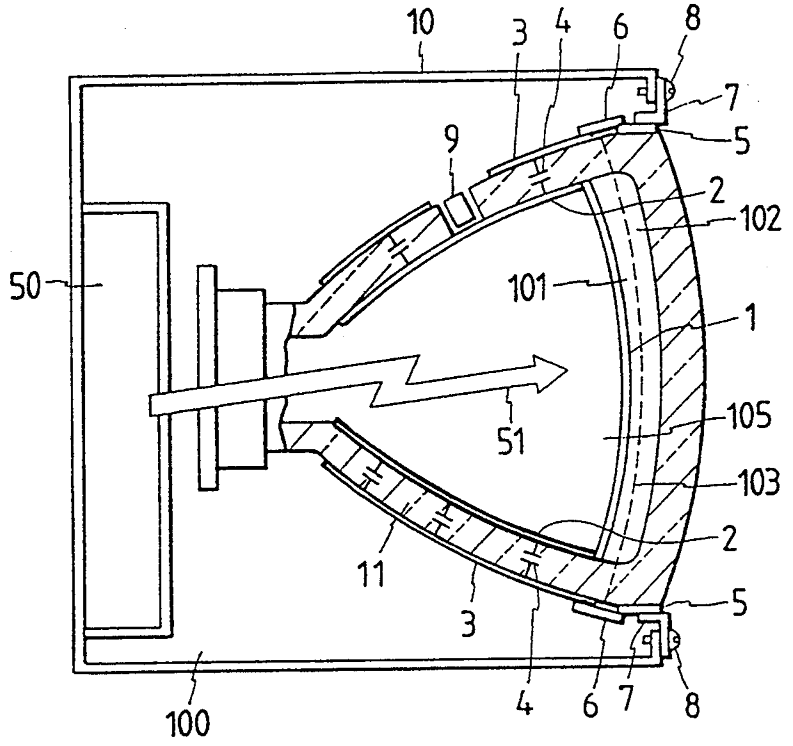
FIG. 1 is a side cross-sectional view of a CRT display unit according to the present invention.

FIG. 1 is a side cross-sectional view of a CRT display unit 100 according to the present invention, where a grounded chassis 10 contains a video amplifier 50 for amplifying to a large amplitude various image micro signals having rectangular waveform and high frequency which are received from a computer (not shown in the figure), and a CRT device 105, both securely fastened to the chassis 10. The envelope of the CRT device 105 comprises a funnel section 101 (facing toward the video amplifier) and a panel section 102, both glass-sealed at a joining section 103 shown in FIG. 1 by a dotted line. On the external surface of the funnel section 101 there is deposited a conductive film 3 for preventing high surge voltages, and a conductive film 2 is deposited on the internal surface of the funnel section 101 for introducing a high voltage from an anode terminal 9 into the CRT device for election beam acceleration. For conductive films 2 and 3, normally graphite is used. The conductive film 2 is electrically connected to the shadow mask 1, and the conductive films 2 and 3 are also electrically coupled through a coupling capacitance 4. The circumference of panel section 102 is surrounded by a metal rim band 5, and the rim band 5 and the conductive film 3 are connected at spaced locations by conductive members 6. The rim band 5 is further connected electrically to the chassis 10 through conductive elastic members 7 and clamping screws 8. Thereby, the shadow mask 1 is electrically connected to the chassis 10 by way of elements 1-2-4-3-6-5-7-8-10.

Figure 2:
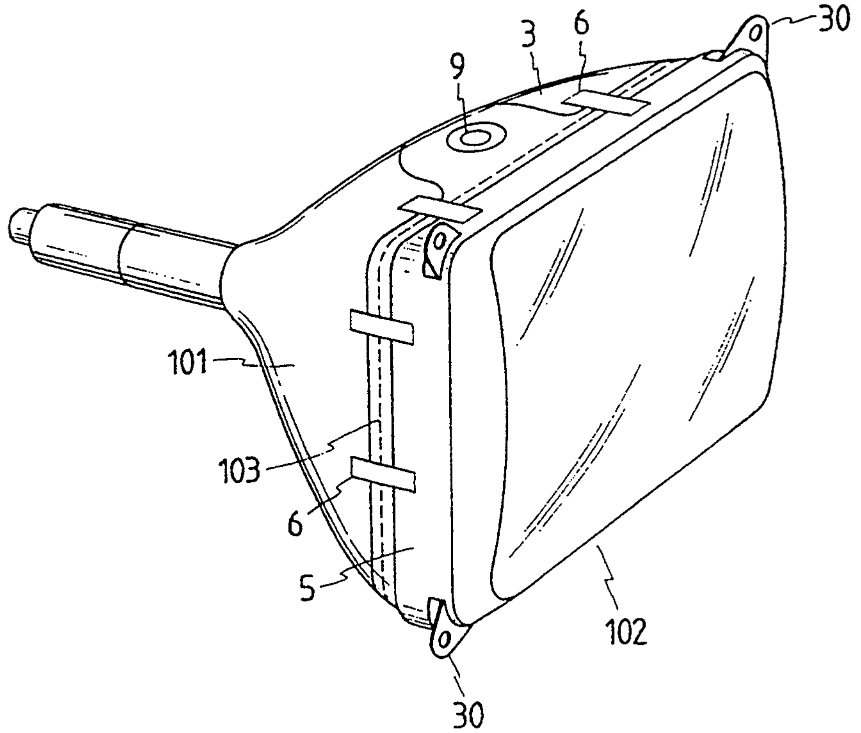
FIG. 2 is a perspective view of the same.

FIG. 2 is a perspective view of the CRT device 105, where the conductive members 6 referred to in FIG. 1 are shown, for instance, in the form of tape having a lining coated with an adhesive, which connects the conductive film 3 and the rim band 5 at a plurality of spaced positions.

As is clearly understandable from FIG. 1, it is preferable for the conductive members 6 to be arranged so as to be not in direct contact with the joining section 103 which joins the funnel section 101 and the panel section 102. This is because air tightness at the joining section 103 is weaker than that at other portions of the CRT envelope, thereby necessitating preventive measures to be taken against deterioration of the hermetic insulation in the joint as a result of application of the conductive film 3 thereon or direct contact with the conductive members 6. As another practical means for installing the conductive members 6 without deteriorating the hermetic insulation, a high voltage insulation paper is first applied on the glass at the joining section 103, and then the conductive member 6 of the present invention may be installed thereon.

Where the conductive member 6 is in the form of tape as shown in FIG. 2, the tape should be made of copper or aluminum with a tape width of 1-3 cm, and its adhesive lining should also have a conductive property. In this embodiment, two strips of conductive tape have been applied to each of the four sides of the envelope, i.e. at the upper, bottom and left and right sides thereof. The tape, needless to say, may be replaced by a plate.

Figure 3:
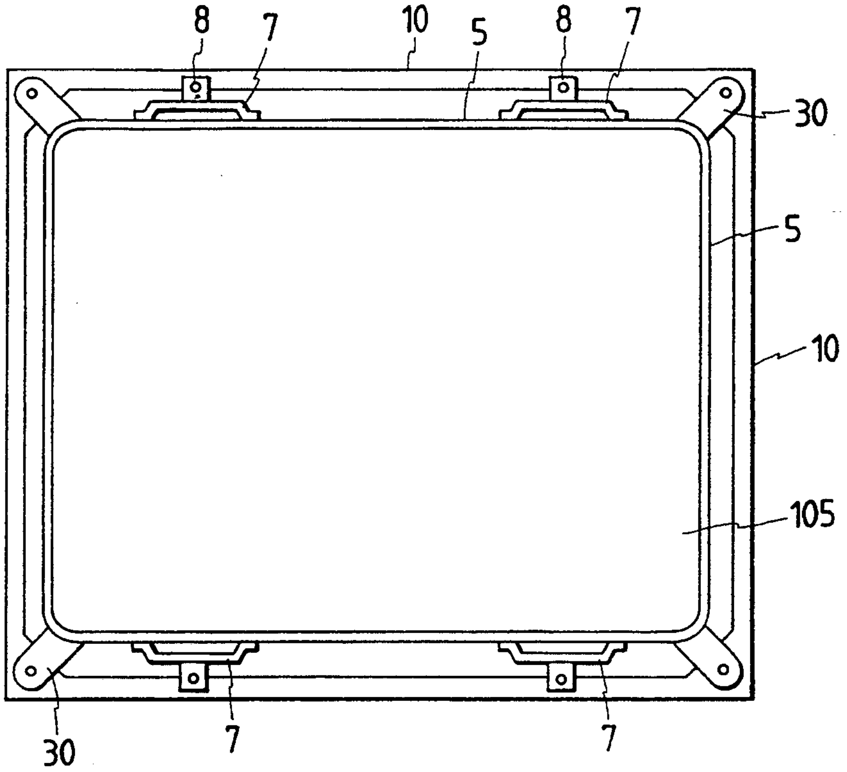
FIG. 3 is a front elevational view of the same.

FIG. 3 is a front elevational view of the CRT display unit shown in FIG. 1, where the CRT device 105 is fastened to the chassis 10 by means of metal fixtures 30 formed together on the rim band 5. with respect to the conductive elastic members 7 in FIG. 1, in fact, as shown in this embodiment, one part of each member 7 is fastened, for example, to the chassis 10 by means of fastening screws 8, and resilient leg portions thereof are pressed in contact with the rim band 5 by means of their resilient force. The conductive elastic member 7 is provided in the form of a spring made of, for example, phosphor bronze or stainless steel, with a length of several cm, and having cushioning properties at both ends. In FIG. 3, two conductive elastic members 7 are provided for each side at the top and bottom of the envelope, but these members also may be added to the left and right sides of the envelope as well.

The number of installations of the above-described conductive members 6 and conductive elastic members 7 may be determined appropriately according to the levels and frequencies of electromagnetic radiation leaking from the CRT display equipment. It is found, however, according to the results of our experiments pursuant to the present invention, that the reduction rate for electromagnetic radiation becomes greater with an increase in the number of conductive elastic members 7 that are employed.

As should be clearly understood from FIGS. 1 and 3, according to the present invention, the shadow mask 1 is electrically connected to the chassis 10 by way of the shadow mask 1-conductive film 2 - coupling capacitance 4 - conductive film 3-conductive member 6 - rim band 5 - conductive elastic member 7-fastening screw 8 - chassis 10, thereby forming an electromagnetic shield plate with the shadow mask. In fact, the electromagnetic radiation 51, as shown diagrammatically in FIG. 1, is reduced substantially and is hardly permitted to leak out of the front panel of the video amplifier 50 due to the presence of this electromagnetic shield plate.

Figure 4:
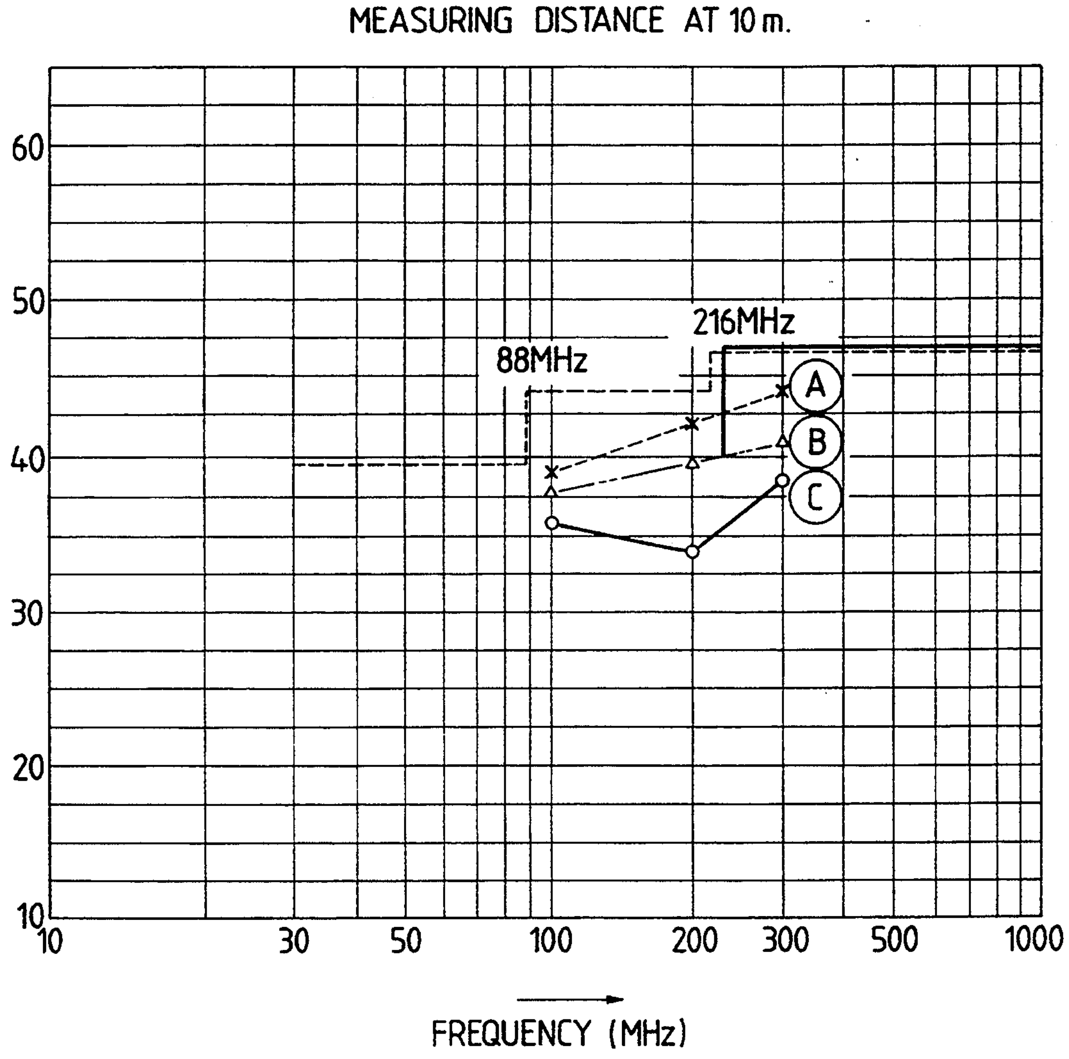
FIG. 4 explains the effects of radiation noise level reduction in the embodiments of the present invention.

FIG. 4 illustrates how this embodiment of the present invention has satisfied the regulation values set by the VCCI and the FFC. In the figure, the X-axis indicates frequencies of electromagnetic radiation, while the Y-axis indicates levels of electromagnetic radiation detected at a distance of 10 m from the source of electromagnetic radiation. Shown in a solid line are the values of regulations set by the VCCI, while shown in a dashed line are those set by the FCC. As can be seen, the regulation values set by the VCCI are more stringent in comparison with those by the FCC. The characteristic (A) represents the case of Japan Patent Laid-Open No. 58-7751 (1983), where the externally clad graphite film 3 is extended as far as the rim band 5, and is grounded by means of metal fixtures 30 installed on the four corners of the rim band to fasten the same to the chassis. The characteristic (B) represents the case of Japan Patent No. 62-267790 (1987), where a ground is provided by grounding at one point in the rim band 5 and at one point in the outer clad graphite portion, respectively. Further, the characteristic (C) represents the case of an embodiment of the present invention, where the rim band 5 and the outer graphite film 3 are connected at a plurality of positions through conductive members 6, and in addition, the rim band 5 and the chassis 10 are connected at a plurality of positions through conductive elastic bodies 7. As is clear from this figure, according to the present invention, radiation noise levels which are lower by 9 dB than the regulation level are attainable at 300 MHz; levels which are lower by 6 dB at 200 MHz than the most stringent VCCI standard are attainable; and levels which are lower by 4 dB at 100 MHz than the VCCI standards are attainable.

Actual reductions in radiation noise levels, for example, by 6 dB, imply that, when evaluated in terms of distance from the noise source, the radiation noise level has been reduced by half. That is, in comparison with the standard CRT display unit having a 40 dB noise level at a distance of 10 m from a noise source at 200 MHz frequency, a CRT display unit according to the present invention is capable of being placed as near as 5 m from the noise source while holding the noise level the same at a 40 dB, at 200 MHz frequency. In other words, according to the present invention, the required distance between the CRT display unit and other electronic equipment susceptible to EMI from the unit can be cut in half.

The advantages of the present invention as described above have been attained by forming a shield plate with of the shadow mask 1 by electrically connecting the shadow mask 1 in a CRT device with the rim band 5 and fastening the same to the chassis 10 through metal fixtures 30, and also by electrically connecting the space between the rim band 5 and the chassis 10 using conductive members 7, thereby reducing radiation noise leaking out of the space significantly.

Figure 5:
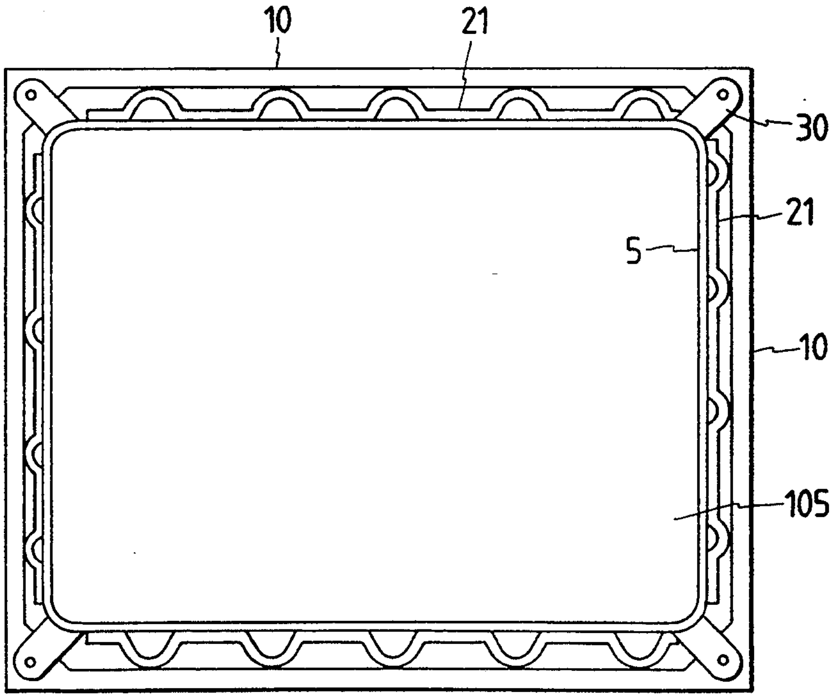
FIGS. 5, 6 and 7 show other embodiments of the present invention.

In FIG. 3, a conductive elastic body was used as a conductive member 7, however, there may be considered other modifications of the present invention as shown in FIG. 5, wherein a gasket 21 is inserted in the space between the rim band 5 and chassis 10. The gasket 21 may be attached either to the rim band 5 or to the chassis 10 before the CRT device is fastened to the chassis 10 by means of metal fixtures 30, otherwise the gasket may be inserted in the space after the fastening has been completed.

Figure 6:
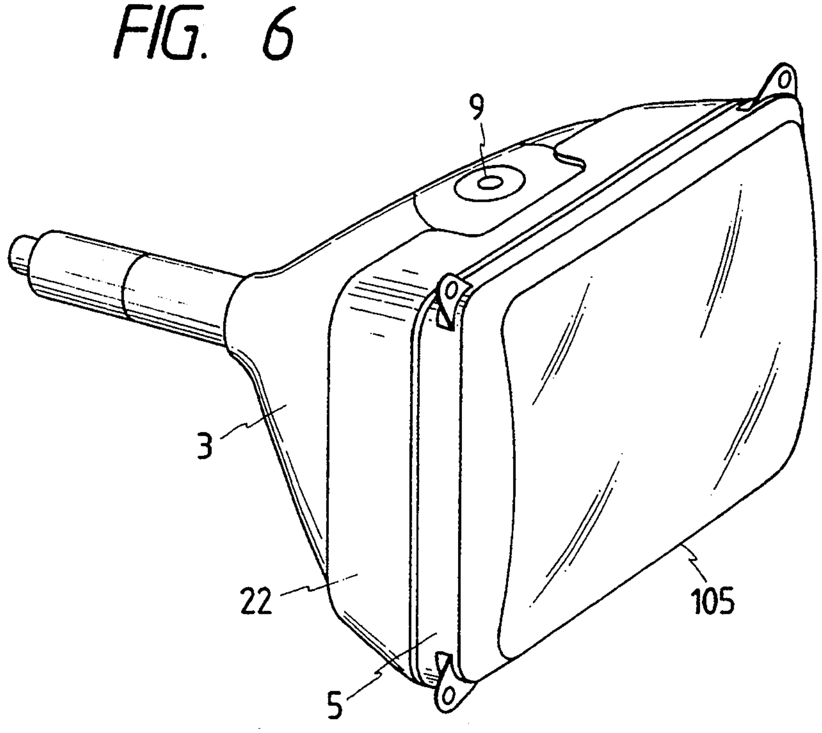

Further, as another means for electrically connecting the conductive film 3 deposited on a CRT envelope and the rim band 5, both may be covered by a metal plate 22 as shown in FIG. 6. Otherwise, as described in Japan Patent No. 58-7751 (1983), the conductive film 3 coated on the bulb funnel section may be extended as far as the rim band through which it is grounded. In such cases, the improvement in preventing emission of electromagnetic radiation is afforded by the presence of the conductive member 7.

Figure 7:
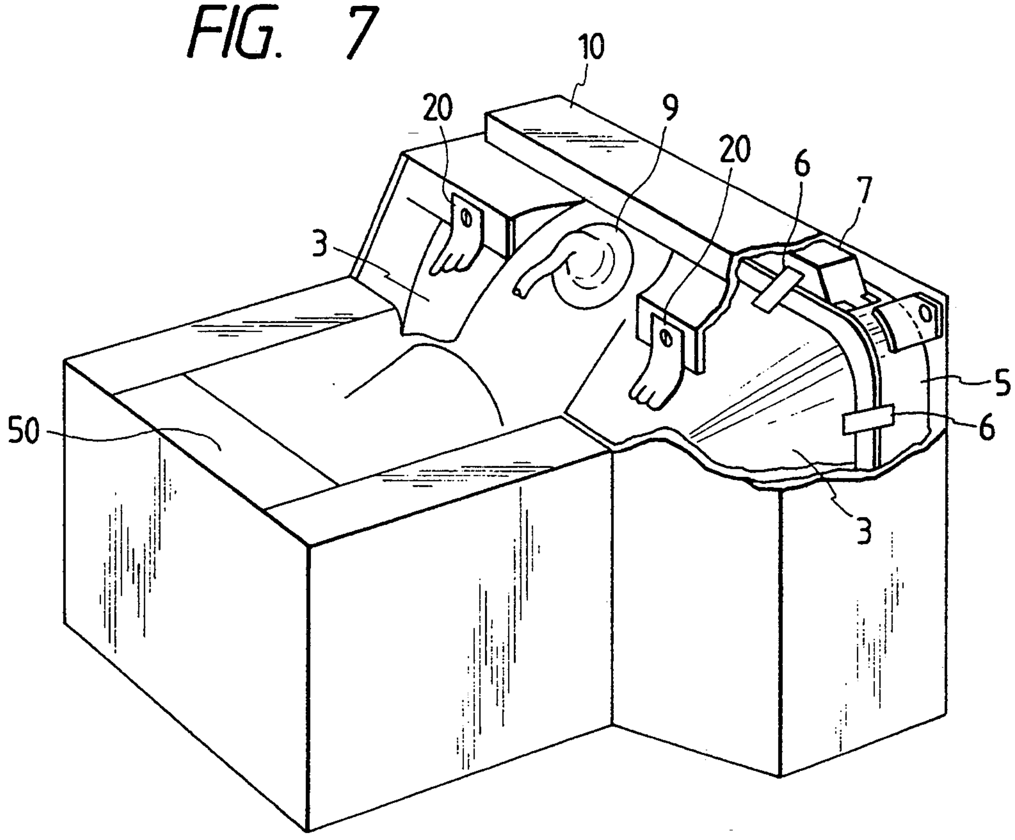

Still further, as shown in an embodiment in FIG. 7, it may be arranged for conductive members 6 to be electrically connected to the conductive film 3 and the rim band 5, and at the same time, for a conductive elastic body 20 to be fastened at one end to chassis 10, and press-contacted to the conductive coated film 3 at the other end.

According to the present invention, there has been provided CRT display equipment capable of attaining, with sufficient margin, the regulation values imposed such devices on regarding the emission of electromagnetic radiation.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrange-ments included within the spirit and scope of the claims.

We claim:

1. A CRT display unit comprising:
- a chassis enclosing a video amplifier for amplifying video signals and a CRT device having an envelope formed by a funnel section and a panel section sealed at a joining section and conductive coating films coated on both internal and external surfaces of the funnel section, the perimeter of the panel section being surrounded by a metal rim band, and the envelope being fastened to the chassis by means of a metal fixture installed on the rim band;
- a first conductive member electrically connecting the conductive coating film on the external surface of said funnel section to said rim band; and
- a chassis conductive member installed in a space between the rim band and the chassis for electrically connecting the rim band to the chassis,
- wherein a plurality of second conductive members are provided in said space between the rim band and the chassis.

2. A CRT display unit as defined in claim 1, wherein said second conductive members are spring members spaced around the perimeter of said panel section.

3. A CRT display unit as defined in claim 1, wherein said second conductive members are spring members spaced around the perimeter of said panel section.

4. A CRT display unit comprising:
- a metal chassis enclosing a CRT device provided with a shadow mask and an envelope enclosing said shadow mask, a rim band surrounding the perimeter of said envelope, and a metal fixture for fastening said rim band to said chassis;
- connection means for electrically connecting said shadow mask to said rim band; and
- a conductive member installed in an annular space between the rim band and the chassis for electrically connecting the rim band to the chassis,
- wherein a plurality of conductive members are provided in said space at locations spaced around the perimeter of said CRT device for electrically connecting said rim band to said chassis.

5. A CRT display unit comprising:
- a metal chassis enclosing a CRT device provided with a shadow mask and an envelope enclosing said shadow mask, a metal rim band surrounding the perimeter of said envelope, and a metal fixture installed on said rim band for fastening the rim to said chassis;
- connection means for electrically connecting said shadow mask to said chassis; and
- a conductive member installed in a space between the rim band and the chassis for electrically connecting the rim band to the chassis,
- wherein a plurality of conductive members are provided in said space at locations spaced around the perimeter of said CRT device for electrically connecting said rim band to said chassis.

* * * * *